(12) United States Patent
Werner

(10) Patent No.: US 10,216,824 B2
(45) Date of Patent: *Feb. 26, 2019

(54) EXPLANATORY ANIMATION GENERATION

(71) Applicant: SAP SE, Walldorf (DE)

(72) Inventor: Horst Werner, Muehlhausen-Rettigheim (DE)

(73) Assignee: SAP SE, Walldorf (DE)

( * ) Notice: Subject to any disclaimer, the term of this patent is extended or adjusted under 35 U.S.C. 154(b) by 665 days.

This patent is subject to a terminal disclaimer.

(21) Appl. No.: 14/097,494

(22) Filed: Dec. 5, 2013

(65) Prior Publication Data

US 2014/0095500 A1   Apr. 3, 2014

Related U.S. Application Data

(63) Continuation of application No. 13/472,348, filed on May 15, 2012, now Pat. No. 8,612,443.

(51) Int. Cl.
*G06F 17/30* (2006.01)

(52) U.S. Cl.
CPC .. *G06F 17/30595* (2013.01); *G06F 17/30604* (2013.01); *G06F 17/30017* (2013.01)

(58) Field of Classification Search
CPC ......... G06F 17/30017; G06F 17/30595; G06F 17/30604
USPC ................................................. 707/736, 913
See application file for complete search history.

(56) References Cited

U.S. PATENT DOCUMENTS

| | | | |
|---|---|---|---|
| 6,351,559 B1* | 2/2002 | Zhou | G06K 9/2054 382/175 |
| 6,745,163 B1* | 6/2004 | Brocious | G10L 13/00 704/260 |
| 7,143,177 B1* | 11/2006 | Johnson | H04L 12/1822 709/231 |
| 7,653,513 B2 | 1/2010 | Resende et al. | |
| 7,680,314 B2* | 3/2010 | Hong | G06T 7/143 382/131 |
| 7,853,711 B1* | 12/2010 | Johnson | H04L 12/1827 709/231 |
| 7,861,178 B2 | 12/2010 | Lui et al. | |
| 8,612,443 B2 | 12/2013 | Werner | |

(Continued)

OTHER PUBLICATIONS

"U.S. Appl. No. 13/472,348, Non Final Office Action dated Feb. 27, 2013", 15 pgs.

(Continued)

*Primary Examiner* — Shahid A Alam
*Assistant Examiner* — Nargis Sultana
(74) *Attorney, Agent, or Firm* — Schwegman Lundberg & Woessner, P.A.

(57) ABSTRACT

Various embodiments included herein include at least one of systems, methods, and software for explanatory animation generation. Some embodiments include receiving data representative of at least two data items, each data item to be presented as a node. Relationships between these data items are discovered in an interrelated dataset and the relationship is illustrated as a set of sequential nodes on a canvas. A text-script descriptive of each of the nodes is then generated. Finally, such embodiments include generating a visualization with a synchronized voiceover based on the sequence nodes and the text-script, the visualization including each node with a synchronized voiceover of each node.

10 Claims, 6 Drawing Sheets

(56) References Cited

U.S. PATENT DOCUMENTS

| | | | | |
|---|---|---|---|---|
| 2001/0045952 | A1* | 11/2001 | Tenev | G06T 11/206 345/440 |
| 2002/0103874 | A1* | 8/2002 | Woods | G06F 17/30265 709/212 |
| 2003/0018662 | A1* | 1/2003 | Li | H04N 21/4305 715/203 |
| 2004/0090472 | A1* | 5/2004 | Risch | G06F 17/30716 715/853 |
| 2004/0205547 | A1* | 10/2004 | Feldt | G06F 17/241 715/201 |
| 2005/0044503 | A1* | 2/2005 | Richardson | H04L 12/1818 715/753 |
| 2007/0027887 | A1* | 2/2007 | Baldwin | G06F 17/279 |
| 2007/0239839 | A1* | 10/2007 | Buday | H04L 65/4015 709/208 |
| 2008/0016491 | A1* | 1/2008 | Doepke | G06F 9/45512 717/104 |
| 2008/0104225 | A1* | 5/2008 | Zhang | H04L 67/36 709/224 |
| 2009/0249222 | A1* | 10/2009 | Schmidt | H04N 21/2368 715/751 |
| 2009/0288006 | A1* | 11/2009 | Audet | G06F 17/2205 715/716 |
| 2009/0307624 | A1* | 12/2009 | Knight | G06F 3/04847 715/766 |
| 2010/0079460 | A1* | 4/2010 | Breeds | G06F 17/30572 345/440 |
| 2010/0106725 | A1* | 4/2010 | Julian, Jr. | G06F 17/30997 707/737 |
| 2010/0231606 | A1* | 9/2010 | Nelson | G06T 11/206 345/619 |
| 2010/0295856 | A1* | 11/2010 | Ferreira | G06T 1/00 345/441 |
| 2011/0013087 | A1* | 1/2011 | House | A63B 24/0021 348/564 |
| 2011/0066964 | A1* | 3/2011 | Cheong | G06F 8/38 715/771 |
| 2011/0113334 | A1 | 5/2011 | Joy et al. | |
| 2011/0119624 | A1* | 5/2011 | Coldefy | G06F 3/0481 715/810 |
| 2011/0138340 | A1 | 6/2011 | Holm-petersen et al. | |
| 2011/0191676 | A1 | 8/2011 | Guttman et al. | |
| 2011/0264010 | A1* | 10/2011 | Williams | A61B 5/112 600/595 |
| 2011/0271230 | A1* | 11/2011 | Harris | G06F 3/0482 715/810 |
| 2012/0191716 | A1 | 7/2012 | Omoigui | |
| 2012/0265859 | A1* | 10/2012 | Zohar | G11B 27/10 709/219 |
| 2013/0311463 | A1 | 11/2013 | Werner | |
| 2014/0114970 | A1* | 4/2014 | Prabu | G06F 17/30554 707/736 |

OTHER PUBLICATIONS

"U.S. Appl. No. 13/472,348, Notice of Allowance dated Aug. 14, 2013", 10 pgs.

"U.S. Appl. No. 13/472,348, Response filed May 24, 2013 to Non Final Office Action dated Feb. 27, 2013", 12 pgs.

* cited by examiner

EXPLANATORY ANIMATION GENERATION

CROSS-REFERENCE TO RELATED APPLICATIONS

This application is a continuation of U.S. application Ser. No. 13/472,348 filed May 15, 2012, which application is incorporated in its entirety herein by reference.

BACKGROUND INFORMATION

Today, large amounts of interconnected data is available from various sources, such as websites, public and private databases, and within the computing system of companies. However, it is not easy for humans to benefit fully from this information without manually gathering, reviewing, filtering, linking, assembling, and presenting the data. Such tasks can be extremely time consuming, expensive, and daunting, and therefore are typically not performed. As result, the full benefits of available information are not realized.

DETAILED DESCRIPTION

Figure 1:
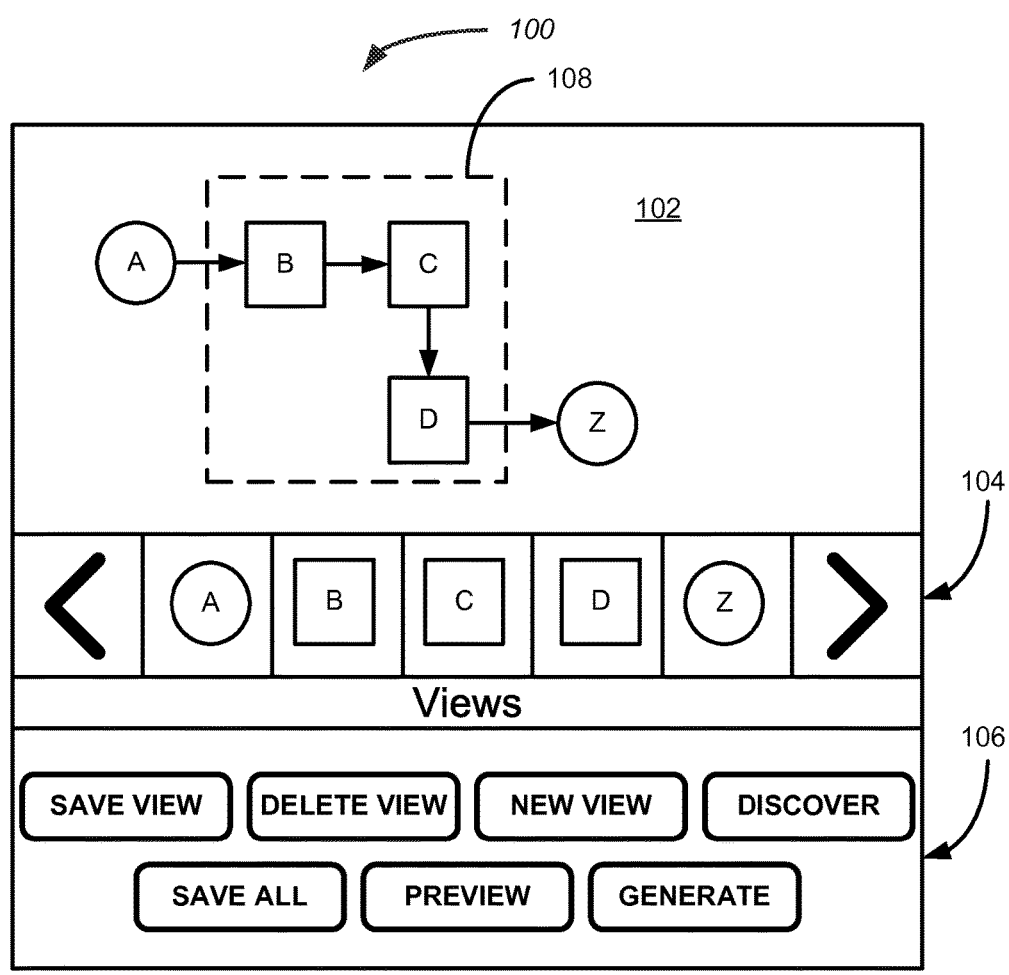
FIG. 1 is a user interface illustration, according to an example embodiment.

Various embodiments presented herein include at least one of systems, methods, and software for automatically creating, in response to minimal input, continuous animations that guide a spectator through complex interrelated information. Such interrelated information typically includes information from data stored, or otherwise present, in computing systems of an enterprise, such as data that may be persisted in an Enterprise Resource Planning (ERP) solution, a database management system, and other systems and data storage mechanisms that persist machine-readable representations of interrelated information.

Generally, any machine-readable representation of interrelated information can be considered a graph. The generation of an animation starts with the specification of multiple topics or entities, which are technically nodes in this graph. For example, a user may wish to know how two entities represented in data are interrelated, such as shared parts between two products where each of the two products are topics or entities. A visualization as generated and presented herein in response to such a user query will identify the relationship between the two products and generate an animation, which may also include a voiceover narration that details the identified relationship. Some such embodiments consist of two major parts: defining a sequence of entities/topics to be shown in the animation and creating a continuous visual representation, also referred to as a visualization, of this sequence.

Some embodiments begin, following receipt of user input of a visualization request, by determining relations between each of a plurality of nodes, typically two or more, which are topics or entities of interest (T1 ... Tn), such as the first and second products. Such embodiments then identify a navigation sequence for representing the relationship in the visualization. The sequence is technically a navigation path through the graph of interrelated data and includes all of the initially specified topics of interest (T1 ... Tn) as well as topics, consisting of other stored data that link the specified topics of interest, on the connecting paths between them.

As mentioned above, the interrelated information is data that is persisted in an ERP solution, a database management system, and other systems and data storage mechanisms. As readily apparent to one of skill in the relevant art, such data may be interrelated in multiple ways when stored in such a manner. While animations may be generated in some embodiments that provide insight into each path of relation, some embodiments operate to provide a quicker illustration of relations between topics of interest. Such embodiments typically operate to identify a shortest path between each pair of topics to limit the data presented in an animation, as a goal in some embodiments is to provide a quick view into such relations. Thus, if two topics of interest are related in multiple ways within the underlying data, the path providing the most direct relation (i.e., traversing the fewest number of nodes) will be utilized in such embodiments to generate the animation.

Once a path of relation between topics of interest is discovered, an order of nodes for the navigation path is derived therefrom. For example, with regard to the two products specified as topics of interest, a single part may be shared between them. The path in such a scenario would be PRODUCT_1→SHARED_PART→PRODUCT_2.

Once the navigation path is determined, a suitable visualization is created. Each node of the navigation path is represented in the visualization. The visualization will present data relevant to the topics of interest, the navigation paths, and relations there between. The data of a node may be visually presented. The data of a node may also, or alternatively, be included in the visualization within a voiceover, audio track generated by a text-to-speech engine in synchronization with a view of the relevant node. In some embodiments, creation of a visualization includes use of visualization templates, or style sheets, associated with underlying data of nodes, objects or database tables from which the data of a node is obtained, as specified by a user, or as may otherwise be configured in a particular embodiment. A visualization template may include a voiceover portion that is applied to the data of a node to generate a script, which is then processed by the text-to-speech engine to generate the audio track of the node. However, some embodiments may instead include voiceover templates, or style sheets, that are distinct from visualization templates and are independently associated with nodes in a similar manner as the visualization templates. Through application of templates to the nodes, data of a visualization is generated. The data of a visualization is renderable by an audio/video presentation program, such as a standalone application or application plug-in that consumes data to present audio and video renderings to users. For example, the data of a visualization may be encoded in a format compliant with an MPEG standard, other video format, a video format consumable by an Adobe® Flash® player or Microsoft® Silverlight® application, or other audio/video format that is consumable by a multimedia renderer.

These and other embodiments are described herein with reference to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software, or a combination of software and hardware in one embodiment. The software comprises computer executable instructions stored on a non-transitory computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions, at least in part, in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a user interface 100 illustration, according to an example embodiment. The user interface 100 provides an authoring environment within which explanatory animations are authored. In particular, the user interface 100 includes a canvas portion 102 within which input is received with regard to topics of interest that are represented by nodes, such as nodes A and Z. The topics of interest are generally linked to data that maybe stored within a computing environment, such as an ERP solution, a database management system, or other system or solution within which data. Once the topics of interest a received, an explanatory animation may be generated therefrom in an automatic manner.

The topics of interest may be received in a drag-and-drop manner from another user interface presenting a view of data, objects, or other representation that is tied to data in some way. The topics of interest may also be received through selection from a query interface associated with the user interface 100. Other mechanisms may also be included in various embodiments that receive input indicating the topics of interest. While the canvas portion 102 includes two topic of interest by circular nodes A and B, more than two topics of interest may also be received.

To generate an explanatory animation, once the topics of interest are added to the canvas portion 102, input may be received triggering the generation. For example, a selection of a "GENERATE" button within an action button portion 106 of the user interface 100 may be received. However, in this and other embodiments, other mechanisms may be provided to trigger the animation generation. For example, menu items may be provided, a "hot-button" keyboard key or set of keys may be configured, an input gesture may be received via a touch screen or pointing device, and the like.

Once the generate function is triggered, an application providing the user interface, in some embodiments, operates to discover a relationship between the data items underlying the topics of interest. Discovering the relationship typically includes identification of at least one other data item involved in the relationship. Each of the discovered at least one other data items are added as nodes within the canvas, such as square nodes 108 B, C, and D. A visualization sequence is then derived from the relationship between nodes presented within the canvas portion 102. The visualization sequence is an order of the nodes that will be utilized in generating views of the nodes within a continuous visualization sequence providing the explanatory animation. The order typically will start with a node of one of the topics of interest and traverse the nodes in a relational manner to another topic of interest. If there are more than two topics of interest, the visualization sequence may include a split that branches out to one topic of interest and then returns to the split to continue on to another topic of interest.

Following identification of the visualization sequence, a text-script may then be generated for each node. The text-script for each node is generated to provide an explanatory description of each respective node. The text-script will be provided in synchronization in the animation with the respective nodes for which a text-script is generated.

Next, at least one animation is generated for each of the nodes, or at least the data from which the animation is rendered is generated. In some embodiments, depending on how a first node is related to a second node, one of the first and second nodes may include multiple views within the animation to provide a view of how the relation between the nodes is defined. For example, when the first node is an employee and the second node is a department within an organization, an animated view of employee data may be provided with the first node followed by a view that illustrates a department to which the employee is assigned. A view of the second node may then be presented to show general data with regard to the department to which the employee is assigned. Note that in such instances where a single node has multiple views within a visualization, a text-script may be generated for each view.

After the animation is generated, the text-scripts are then processed by a text-to-speech engine to generate audio of the voiceovers. The audio of the voiceovers is then combined with the respective animation view portions and the animation is stored. The animation, once assembled, provides a systematic presentation that illustrates and explains a relationship between the topics of interest by traversing views generated from the interconnected data that defines the relationship.

The file format of the stored animation may be one of any number of audio/video file formats. For example, the file format may be a Flash® format that is renderable by the Adobe® Flash® player application plugin. In other embodiments, the file format may be compliant with an MPEG standard or other format from which audio and video data can be rendered.

In some embodiments, once the animation is generated, views included within the animation are then populated into a timeline portion 104 of the user interface. The timeline portion 104 provides a sequence view mechanism whereby an author can traverse node views within the visualization according to a visualization sequence. When a view is selected, the selected view is presented within the canvas portion 102. The user can review the selected view for accuracy and make modifications therein. When modifications are made, the animation can be regenerated and saved, such as through selection of one or more buttons in the action button portion 106. The animation may then be previewed or shared. In either case, the animation may then be viewed, such as is illustrated in FIG. 2.

Figure 2:
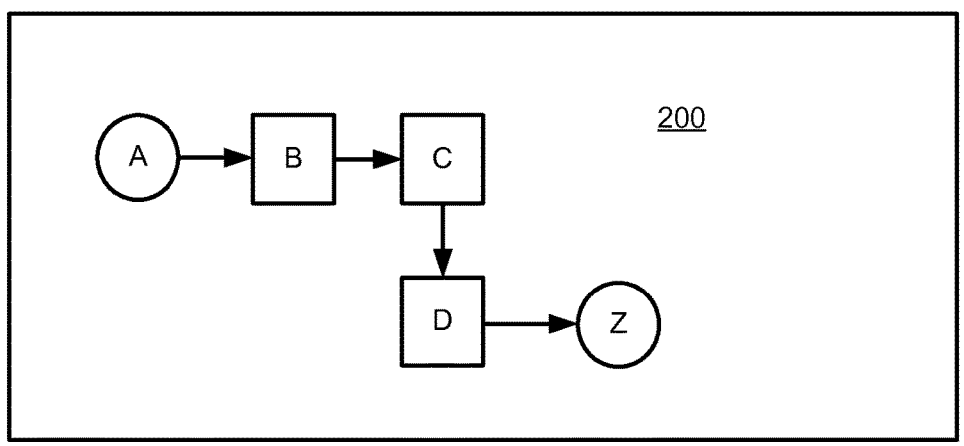
FIG. 2 is a user interface illustration, according to an example embodiment.

FIG. 2 is a user interface 200 illustration, according to an example embodiment. The user interface 200 is an example of a user interface within which an explanatory animation may be viewed. The user interface is generally an interface of an application that consumes audio/video data to present a rendering thereof. The user interface 200 may include various playback controls to effect playback of the animation. The playback controls may include controls such as play, rewind, fast forward, pause, and stop controls. Although not illustrated in FIG. 2, the playback controls may be presented in some embodiments of the user interface 200. In other embodiments, the playback controls are accessible via one or both of application menus and hot-keys or key combinations on a keyboard.

Such embodiments provide computerized mechanisms to convey complex situations—represented in a graph-like data model—to a human without requiring a time-consuming manual preparation. The continuous transitions during the generated animation and the comprehensive spatial context help the spectator to understand and internalize the overall context and the specific relationships between topics as represented in stored data. A generated voiceover that articulates the facts synchronous to the visual sequence further supports the understanding.

Figure 3:
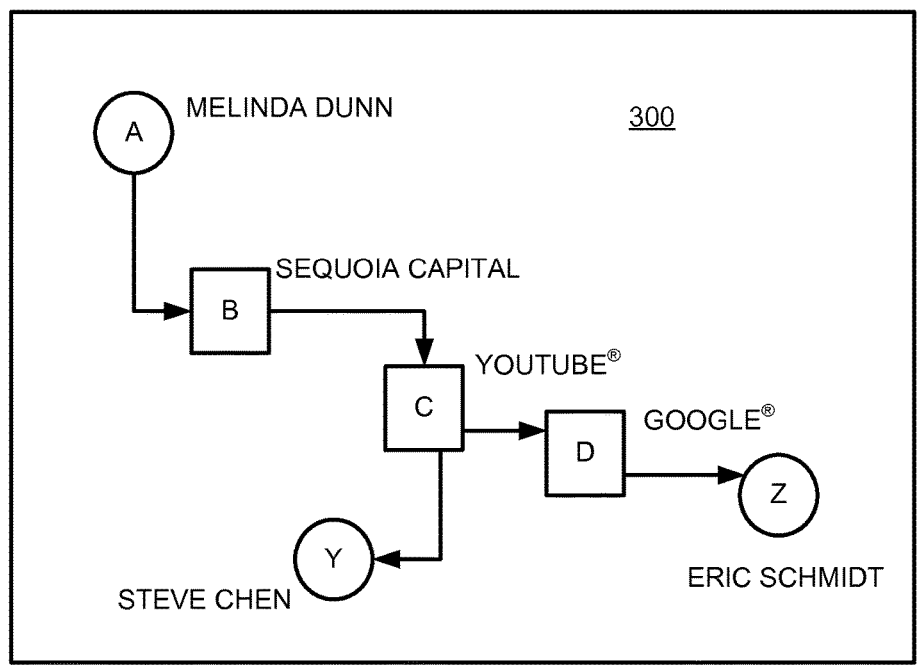
FIG. 3 is a user interface illustration, according to an example embodiment.

The various embodiments can be used in many different use cases, e.g. to create e-learning material in education, for briefing purposes in business or in personal digital assistants. For example, a user could use an application with speech recognition to receive topic of interest input to specify a request such as, "Explain the connection between Melinda Dunn, Steve Chen and Eric Schmidt." This use case is illustrated in FIG. 3. FIG. 3 is a user interface illustration 300, according to such an example embodiment. By accessing a data source such as the publicly available information in Freebase, the application based on such a query would create the navigation path illustrated in the user interface 300, which includes topics of interest "Melinda Dunn," "Steve Chen," and "Eric Schmidt." The topics of interest are represented by circular nodes.

Such embodiments upon receipt of the topics of interest and the request for an explanation of the connections there between would then create and play an animation of as illustrated within the user interface 300 along with an audio voiceover. The animation may start with a photo of Melinda Dunn and provide a voiceover description based on text retrieved from the particular data source from which the animation is generated. Such a description may provide, "Melinda Dunn is the Chief Financial Officer at Sequoia Capital. Melinda's role is to oversee the firm's financial, legal, and administrative activities. Prior to joining Sequoia Capital in 1992, Melinda was the Director of Finance at ComputerLand Corporation. Previously, she was a Senior Accountant for Deloitte & Touche, specializing in high technology clients."

While the voiceover is played, logos of the enterprises DTT, ComputerLand Corporation, and Sequoia Capital may be presented around the photo. Then, the view of the animation within the user interface may change as if a camera zooms in on Sequoia Capital and a description may be provided via the voiceover as, "Sequoia Capital is a Californian venture capital firm located on Sand Hill Road in Menlo Park, Calif. The Wall Street Journal has called Sequoia Capital 'one of the highest-caliber venture firms,' and noted that it is 'one of Silicon Valley's most influential venture-capital firms.'" The view within the user interface 300 may then be changed to display the venture investments as a cloud of tiny logos. The voice says, "Sequoia Capital has investments in 300 businesses, including YouTube®," while the view changes again as if a camera zooms in on the YouTube® logo. The logo may then morph into a view displaying the YouTube® founders around the logo. The voiceover may then provide, "YouTube® has three founders, including Steve Chen," while the camera zooms once more to a picture of Steve Chen. Then, the voiceover description of this person is read, "Steven Shih 'Steve' Chen, born August 1978, is an American internet entrepreneur. He is the co-founder and previous Chief Technology Officer of the popular video sharing website YouTube®. Chen was born in Taipei, Taiwan. When he was eight years old, he and his family immigrated to the United States."

Next, the camera may move back to the previous YouTube® view. The YouTube® view may show the "Organization" view with the properties "Founders," "Board Members," "Parent," "Slogan," and "Acquisition." The view may then zoom in on the acquisition property that contains the logo of Google®. The voiceover may then provide, "YouTube was acquired by Google®."

Finally, the camera may zoom in on Google® and the "Organization" view is displayed. The view zooms in on the property "Board Members" as the voice says, "Google® has 9 board members, including Eric E. Schmidt." At last, the view zooms in on Eric E. Schmidt and the voiceover may provide, "Google® founders Larry Page and Sergey Brin recruited Eric Schmidt from Novell®, where he led that company's strategic planning, management, and technology development as chairman and CEO. Since joining Google®, Eric has focused on building the corporate infrastructure needed to maintain Google's rapid growth as a company and on ensuring that quality remains high while product development cycle times are kept to a minimum."

Figure 4:
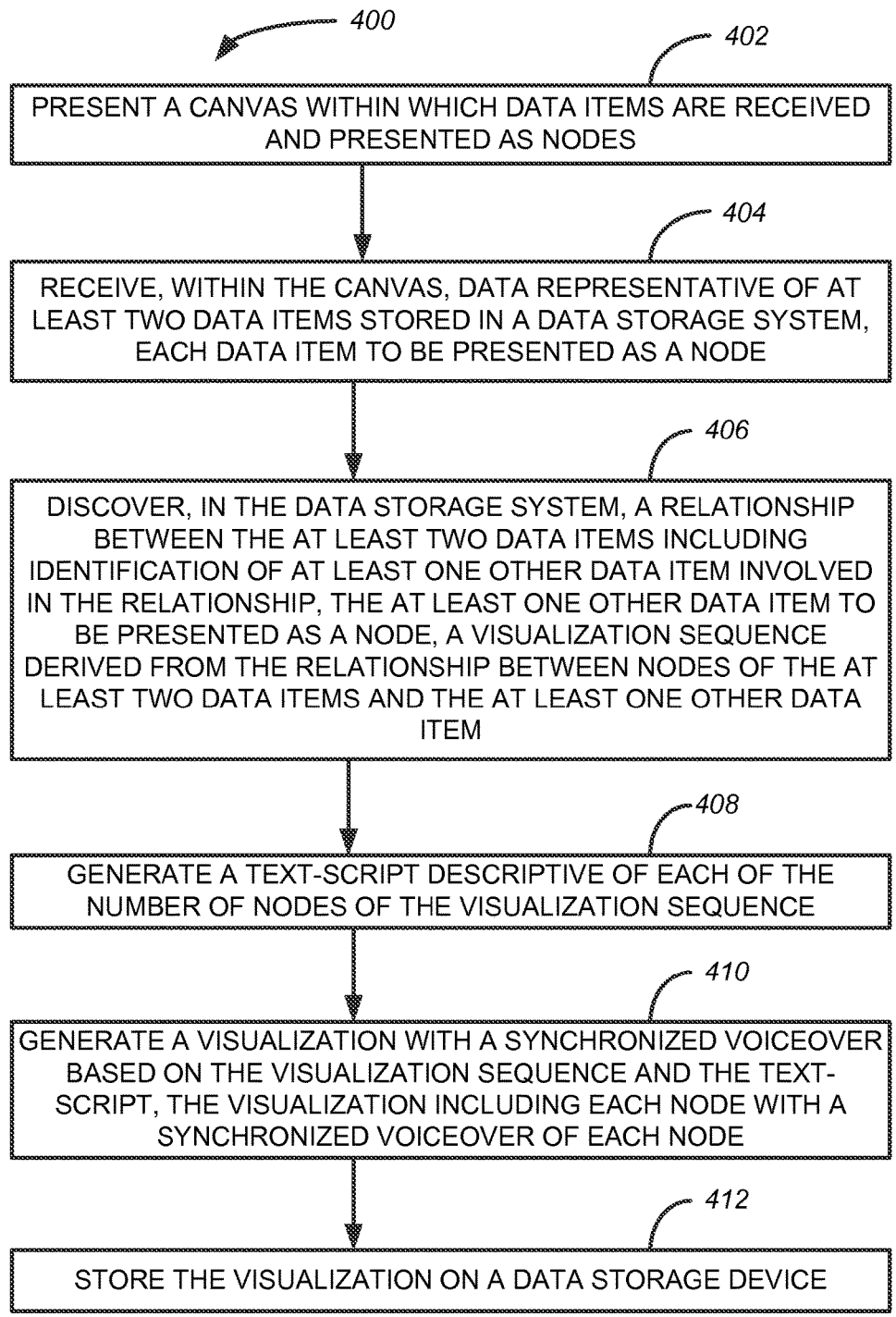
FIG. 4 is a block flow diagram of a method, according to an example embodiment.

FIG. 4 is a block flow diagram of a method 400, according to an example embodiment. The method of FIG. 4 is an example method of how an animation may be generated in some embodiments. The method 400 includes presenting 402 a canvas within which data items are received and presented as nodes. Further, the method 400 includes receiving 404, within the canvas, data representative of at least two data items stored in a data storage system. Each received 404 data item is then presented as a node within the canvas. These received data items are the topics of interest as discussed previously.

Once the data items have been received, a command may be received to generate a visualization. Generating the visualization includes discovering 406, in the data storage system, a relationship between the at least two data items. Discovering 406 the relationship typically includes identifying at least one other data item involved in the relationship. Each of the at least one other discovered 406 data items are added to the canvas as nodes in a location relative to the relationship of the respective data item to a node of another data item already present in the canvas. A visualization sequence may then be derived from the relationship between nodes of the at least two data items and the at least one other data item that have been added to the canvas. The visualization sequence is the order in which the nodes and data represented by the nodes will be presented within the visualization once generated.

The method 400 further includes generating 408 a text-script descriptive of each of the number of nodes of the visualization sequence. The text-script for each node is generated based on data underlying the respective node. The text-script may be actual text retrieved from the data storage system with regard to the data item represented by the node.

The method 400 continues by generating 410 a visualization with a synchronized voiceover based on the visualization sequence and the text-script. The generated 410 visualization will include each node with a synchronized voiceover of each node. The generated 410 visualization may then be stored on a data storage device, such as a memory, on a hard drive, or a remote network storage location. The visualization may then be viewed.

In some embodiments, generating 410 the visualization with the synchronized voiceover based on the visualization sequence and the text-script includes use of templates, such as style sheets. Such templates may be identified with regard to one or more nodes included in a visualization sequence. For example, templates may be associated with objects, database tables, or other data sources from which data represented by a node is obtained. The templates may provide rendering instructions with regard to how a node is to be presented within a visualization, what text is to be included in a text-script from which a voiceover is generated, or both. Thus, in such embodiments, generating 410 the visualization with the synchronized voiceover includes, for each node, identifying a template based on at least one of data of interest to be presented, a default configuration, and an association of data underlying the node to a template. Next, when a voiceover template is in use, such embodiments may include generating audio voiceover data based on text-script data associated with the respective node. Finally, such embodiments include copying, into a data set of the visualization, relevant data of the identified template, data of the data item the node is to represent, and the audio voiceover data.

In some embodiments, generating 410 the visualization includes processing the text-script with a text-to-speech engine to generate the voiceover. In other embodiments, the text-script is included in the visualization and is processed by a text-to-speech engine included within an application or application plug-in that consumed the visualization data in rendering the visualization to a viewer. In a further embodiment, generating 410 the visualization includes processing the text-script with a text-to-speech engine to generate the voiceover and the visualization includes the audio voiceover as well as the text-script from which captions may be provided.

In some embodiments, discovering 406 the relationship between the at least two data items includes identifying in data stored in the data storage system, a shortest path of relation between each pair of the at least two data items, which as discussed above are the topics of interest from which the visualization is generated. The shortest path typically includes the at least one other data item. A sequence of the shortest path relation between each pair of the at least two data items is then added to the visualization sequence.

In such embodiments, when there are more than two data items within the at least two data items (e.g., more than two topics of interest), identification of the shortest path involves further processing. For example, in some such embodiments, identifying the shortest path of relation between each pair of the at least two data items includes identifying the pair of data items having the longest path of all shortest paths as the shortest path. For example, with regard to the illustration of FIG. 3, there are two shortest paths—the path from Melinda Dunn to Steve Chen, which includes two intervening nodes, and the path from Melinda Dunn to Eric Schmidt, which includes three intervening nodes. In this case, the path from Melinda Dunn to Eric Schmidt is the longest of all the shortest paths as it includes a great number of intervening nodes. This longest path of all the shortest paths is then added to the visualization sequence. However, the path to Steve Chen from Melinda Dunn has not yet been added to the visualization sequence. In such instances, for data items of the at least two data items and of the at least one other data item not yet added to the visualization sequence, a not-visited list of those data items is created. The not-visited list is then processed.

Processing of the not-visited list, in some embodiments, includes for each data item included in the not-visited list, add a shortest path of data items from a data item already included in the visualization sequence to the respective data item. As a data item included in the not-visited list is added to the visualization sequence, the processing includes removing the data item from the not-visited list. Thus, referring again to FIG. 3, the not-visited list would include a listing for the "Steve Chen" node. The shortest path from each node already included would then be determined and the shortest path from the already included nodes to the "Steve Chen" node would be identified. This results in identification of the "YouTube®" node to the "Steve Chen" node. This path is then added to the visualization sequence and the "Steve Chen" node is removed from the not-visited list. Note that adding the path to the "Steve Chen" node involves adding a split to the visualization sequence and a divergent route from the main visualization sequence. In such situations, the resulting visualization may follow one path and then revert to a node previously visited and the divergent path may then be followed.

Figure 5:
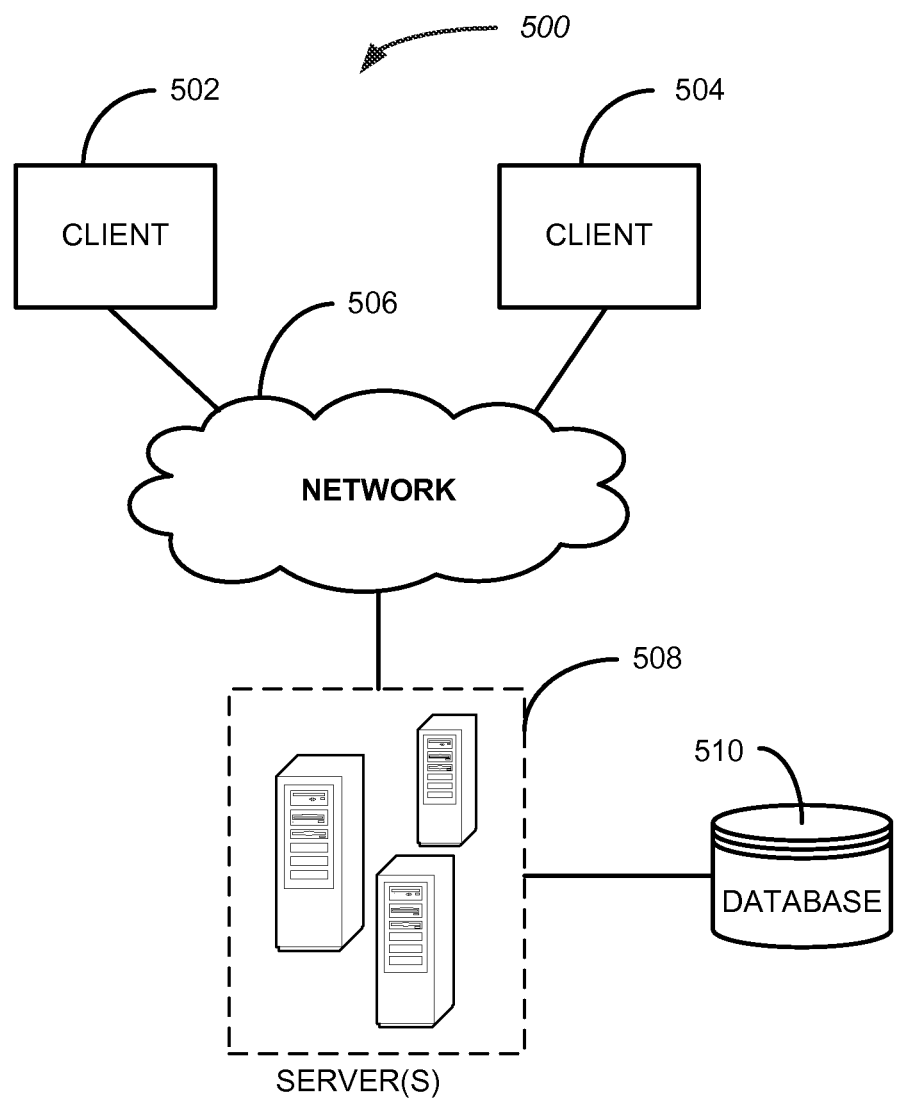
FIG. 5 is a logical block diagram of a system, according to an example embodiment.

FIG. 5 is a logical block diagram of a system 500, according to an example embodiment. The system 500 is an example of a computing environment within which some embodiments presented herein may operate. The system 500 includes clients 502, 504 connected to a network 506. Also connected to the network 506 are one or more servers 508 that may also be connected to one or more databases 510. A visualization may be generated via a client 502 that accesses, via the network 506, a web based application hosted by the one or more servers 508. The one or more servers may present an application view, such as is illustrated and described with regard to FIG. 1. The user of the client 502 may interact with the application via a web browser, a thick-client application, a rich-internet application, an app, or other software application to generate a visualization based on data stored in the database 510 or data otherwise accessible via the network 506, such as a website. The user of the client 502 may then view a generated visualization and share the visualization with others via the network, such as a user of the client 504.

The clients 502, 504 in some embodiments are personal computers. However, in other embodiments, one or more of the clients 502, 504 may be a tablet computing device, a smartphone, a set top box, a smart controller of another device or apparatus such as a television, automobile, and the like, and other processor enabled computing devices. The clients 502, 504 when viewing an animation may receive the animation as streaming audio/video data. However, in some embodiments, the animation may be received as a file via the network 506, such as an email attachment or file download, or via an out-of-band means, such as on an optical disc or on a memory stick.

Figure 6:
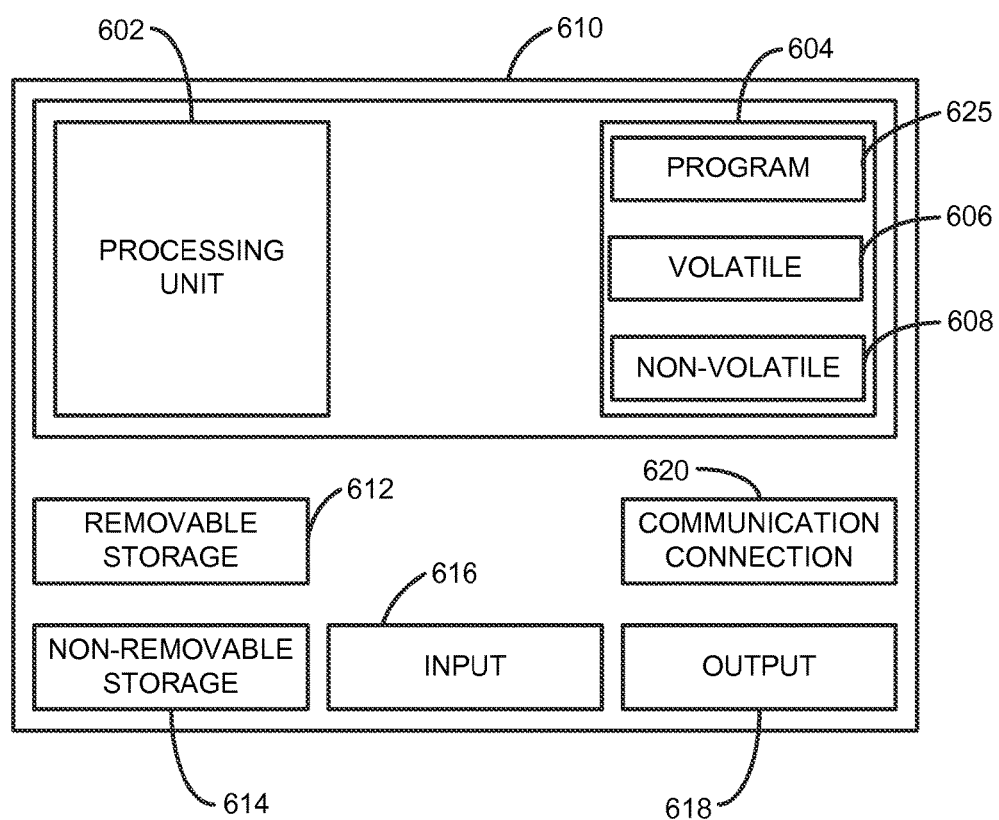
FIG. 6 is a block diagram of a computing device, according to an example embodiment.

FIG. 6 is a block diagram of a computing device, according to an example embodiment. The computing device is an example of a one or more of the clients 502, 504 and servers 508 of FIG. 5 according to some embodiments. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 610, may include a processing unit 602, memory 604, removable storage 612, and non-removable storage 614. Memory 604 may include volatile memory 606 and non-volatile memory 608. Computer 610 may include—or have access to a computing environment that includes—a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 610 may include or have access to a computing environment that includes input 616, output 618, and a communication connection 620. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a non-transitory computer-readable medium are executable by the processing unit 602 of the computer 610. A hard drive, CD-ROM, and RAM are some examples of articles including a non-transitory computer-readable medium. For example, a computer program 625 capable of performing one or more of the methods illustrated and described herein.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   presenting a user interface, the user interface comprising a canvas portion within which data items are received and presented as nodes and a sequence portion;
   receiving, within the canvas portion, data representative of at least two data items stored in a data storage system, each data item to be presented as a node displayed at the canvas portion, wherein the receiving comprises:
      receiving an indication that a first representation of a first data item of the at least two data items is selected and dragged to the canvas portion; and
      receiving an indication that a second representation of a second data item of the at least two data items is selected and dragged to the canvas portion;
   discovering, in the data storage system, a relationship between the at least two data items, wherein the discovering comprises:
      identifying at least one other data item involved in the relationship, the at least one other data item to be presented as a node displayed at the canvas portion;
      identifying a shortest path of relation between the at least two data items; and
      deriving a visualization sequence from a relationship between nodes of the at least two data items and the node of the at least one other data item, wherein the visualization sequence includes the shortest path;
      generating a text-script descriptive of each of a number of nodes of the visualization sequence;
      generating, at the canvas portion, a visualization with a synchronized voiceover based on the visualization sequence and the text-script, the visualization comprising a first node for the first data item, a second node for the second data item, and a third node for a third data item of the at least one other data item, each node with a synchronized voiceover, the visualization also graphically indicating a relationship between at least two of the first node, the second node, and the third node;
   displaying at the sequence portion a representation of the first node, the second node, and the third node in an order according to the visualization sequence; and
   storing the visualization on a data storage device.

2. The method of claim 1, wherein the generated visualization includes data consumable by a multimedia renderer.

3. The method of claim 2, wherein the synchronized voiceover includes text associated with each node consumable by a text-to-speech engine of the multimedia renderer.

4. The method of claim 1, wherein generating the visualization with the synchronized voiceover based on the visualization sequence and the text-script includes, for each node:
   identifying a template based on at least one of data of interest to be presented, a default configuration, and an association of data underlying the node to a template;
   generating audio voiceover data based on text-script data associated with the respective node; and
   copying, into a data set of the visualization, data of the identified template, data of the data item the node is to represent, and the audio voiceover data.

5. A non-transitory computer-readable storage medium, with instructions stored thereon, which when executed by at least one processor of a computer cause the computer to perform operations comprising:
   presenting a user interface comprising a canvas portion within which data items are received and presented as nodes and a sequence portion;
   receiving, within the canvas portion, data representative of at least two data items stored in a data storage system, each data item to be presented as a node displayed at the canvas portion, wherein the receiving comprises:
      receiving an indication that a first representation of a first data item of the at least two data items is selected and dragged to the canvas portion; and
      receiving an indication that a second representation of a second data item of the at least two data items is selected and dragged to the canvas portion;

discovering, in the data storage system, a relationship between the at least two data items, wherein the discovering comprises:
identifying a shortest path of relation between the at least two data items; and
identifying at least one other data item involved in the relationship, the at least one other data item to be presented as a node displayed at the canvas portion; and
deriving a visualization sequence from a relationship between nodes of the at least two data items and the node of the at least one other data item, wherein the visualization sequence includes the shortest path;
generating a text-script descriptive of each of a number of nodes of the visualization sequence;
generating, at the canvas portion, a visualization with a synchronized voiceover based on the visualization sequence and the text-script, the visualization comprising a first node for the first data item, a second node for the second data item, and a third node for a third data item of the at least one other data item, each node with a synchronized voiceover, the visualization also graphically indicating a relationship between at least two of the first node, the second node, and the third node;
displaying at the sequence portion a representation of the first node, the second node, and the third node in an order according to the visualization sequence; and
storing the visualization on a data storage device.

6. The non-transitory computer-readable storage medium of claim 5, wherein the generated visualization is renderable within the canvas portion.

7. The non-transitory computer-readable storage medium of claim 5, wherein generating the visualization with the synchronized voiceover based on the visualization sequence and the text-script includes, for each node:
identifying a template based on at least one of data of interest to be presented, a default configuration, and an association of data underlying the node to a template;
generating audio voiceover data based on text-script data associated with the respective node; and
copying, into a data set of the visualization, data of the identified template, data of the data item the node is to represent, and the audio voiceover data.

8. A system comprising:
at least one processor, at least one memory device, at least one video output device, and at least one network interface device;
a user interface application stored on the at least one memory device and executable by the at least one processor to perform operations comprising:
presenting a user interface comprising a canvas portion and a sequence portion, wherein data items are received as input and presented as nodes of visualization output within the canvas portion, and wherein the user interface is presented via that at least one visual output device;
receiving, at the canvas portion, data representative of at least two data items stored in a data storage system accessible via the at least one network interface device, each data item to be included as a node in a visualization, wherein the receiving comprises:
receiving an indication that a first representation of a first data item of the at least two data items is selected and dragged to the canvas portion; and
receiving an indication that a second representation of a second data item of the at least two data items is selected and dragged to the canvas portion;
receiving command input to generate a visualization and pass the data representative of the at least two data items to a visualization generator;
the visualization generator stored on the at least one memory device and executable by the at least one processor to perform operations comprising:
discovering, in the data storage system accessible via the at least one network interface device, a relationship between the at least two data items wherein the discovering comprises:
identifying at least one other data item involved in the relationship, the at least one other data item to be presented as a node;
identifying a shortest path of relation between the at least two data items; and
deriving a visualization sequence from a relationship between nodes of the at least two data items and the at least one other data item, wherein the visualization sequence includes the shortest path;
generating a text-script descriptive of each of a number of nodes of the visualization sequence;
generating, at the canvas portion, a visualization with a synchronized voiceover based on the visualization sequence and the text-script, the visualization comprising a first node for the first data item, a second node for the second data item, and a third node for a third data item of the at least one other data item, each node with a synchronized voiceover of each node, the visualization also graphically indicating a relationship between at least two of the first node, the second node, and the third node;
displaying at the sequence portion a representation of the first node, the second node, and the third node in an order according to the visualization sequence; and
storing the visualization on the at least one memory device.

9. The system of claim 8, wherein the generated visualization includes data consumable by a multimedia renderer.

10. The system of claim 9, wherein the synchronized voiceover includes text associated with each node consumable by a text-to-speech engine of the multimedia renderer.

* * * * *